July 4, 1967

R. E. OBENHAUS 3,329,869

CONTROL APPARATUS

Filed Feb. 3, 1965

Robert E. Obenhaus,
Inventor
Koenig, Senniger, Powers and Leavitt,
Attorneys

FIG. 2.
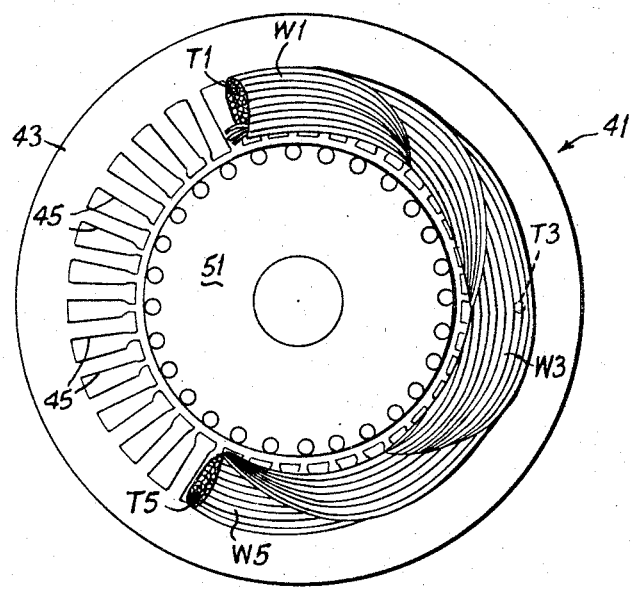
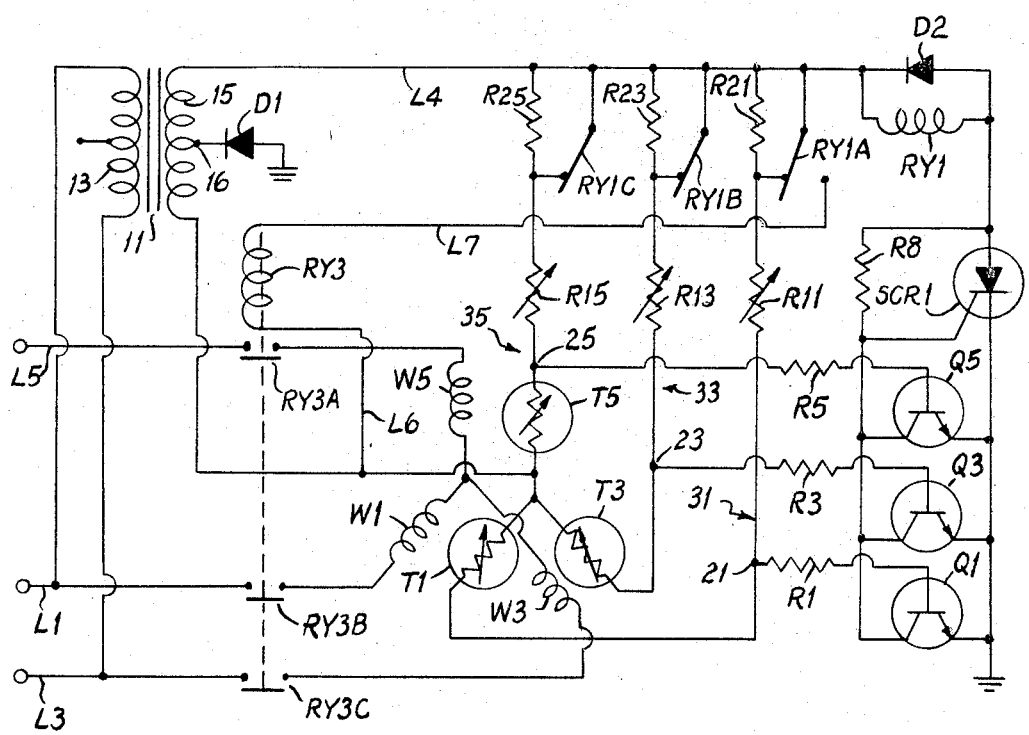
FIG. 3.

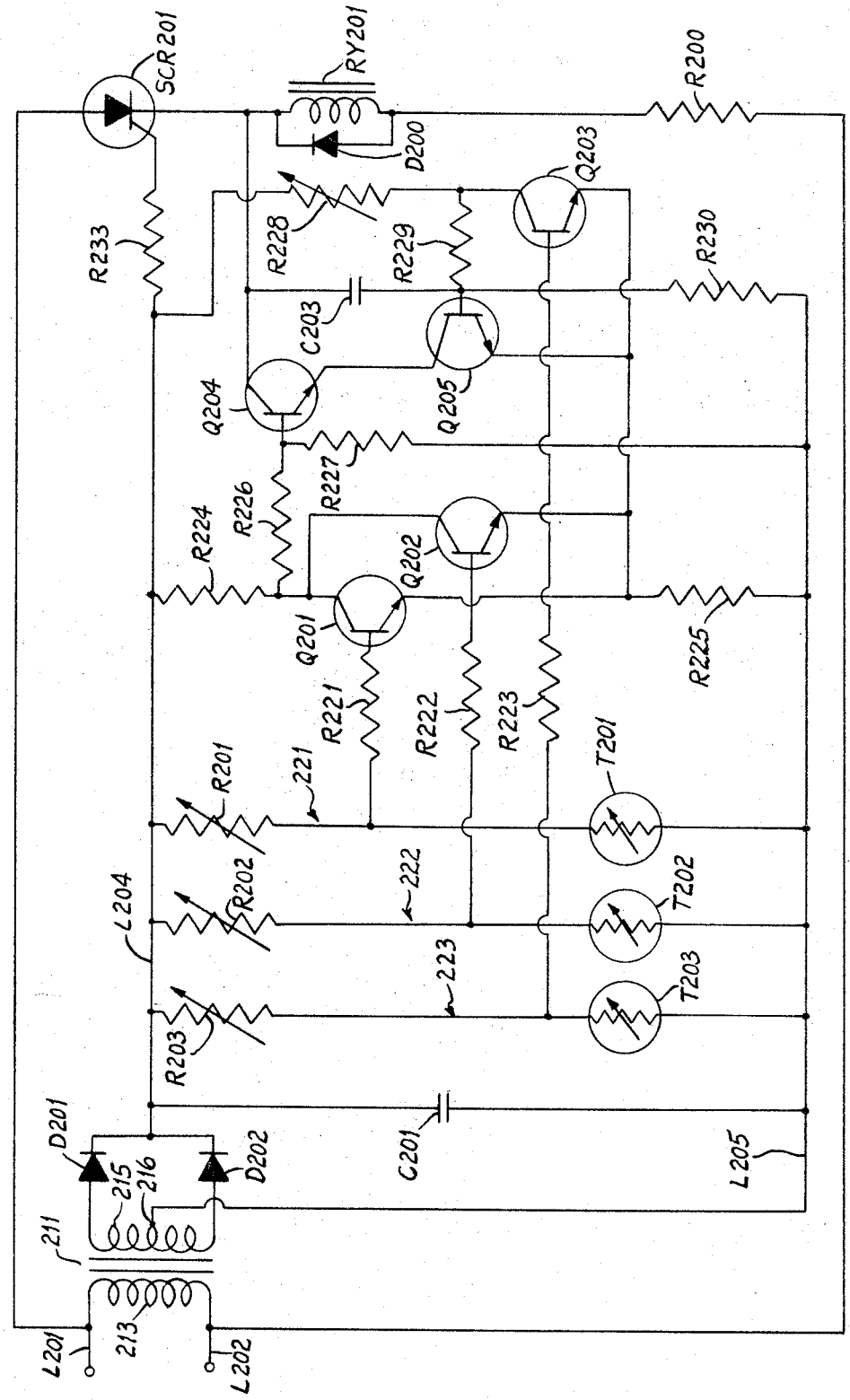

United States Patent Office 3,329,869
Patented July 4, 1967

3,329,869
CONTROL APPARATUS
Robert E. Obenhaus, South Easton, Mass., assignor to Texas Instruments Incorporated, Dallas, Tex., a corporation of Delaware
Filed Feb. 3, 1965, Ser. No. 430,006
25 Claims. (Cl. 317—13)

This invention relates to controls and more particularly to controls for load devices which are responsive to a plurality of variable conditions or parameters.

This application is a continuation-in-part of my co-pending application, Ser. No. 389,936, filed Aug. 17, 1964 now abandoned.

In providing thermal overload protection for electric motors, particularly polyphase A.C. motors, it is highly desirable that the temperature of the winding be sensed at several locations by sensors having a rapid response to temperature changes. The motor should be immediately deenergized if the temperature of the portions of the winding contiguous any one of these locations rises above a predetermined temperature. The temperature present at the other locations should not influence the temperature threshold of the one.

In refrigeration and air conditioning apparatus, it is frequently desirable that the compressor motor be controlled in response to several different conditions or parameters which may vary independently. Under normal operating conditions, the compressor will be recycled under thermostatic control to maintain a room or controlled zone at the desired temperature. The compressor motor itself should be sensed as to temperature and should be deenergized if it overheats so that permanent damage is prevented. Finally, it may be desirable to stop the compressor to permit defrosting, the buildup of frost being detected by an abnormal drop in temperature at the evaporator caused by the insulating effect of the frost envelope.

Among the objects of the present invention may be noted: the provision of a system for the multiple-point thermal protection of electric devices, particularly polyphase A.C. motors; the provision of electronic control for an electric load, such as a compressor motor, which control is responsive to a plurality of variable conditions, such as temperatures at different locations; the provision of such a control which requires only one power switching device for the load; the provision of such a control in which each sensed condition independently effects a control over the load; the provision of such a control in which response differentials are independently predeterminable for each of the variable conditions; the provision of such a control which will independently control each of a pair of load devices in response to respective pluralities of variable conditions; and the provision of such a control which is sensitive to small changes in the sensed conditions, which is capable of providing the same control in response to opposite changes in condition, which employs solid state circuitry, which is highly reliable and which is of relatively simple and inexpensive construction. Other objects and features will be in part apparent and in part pointed out hereinafter.

Essentially, the invention relates to a control in which a plurality of condition-responsive voltage dividers are connected in parallel across a voltage source, each voltage divider including a condition-responsive impedance element and a reference impedance element connected in series therewith. A single relay means or current switching means for controlling the flow of electric power to a load device is operated under the control of a plurality of electronic transducers, each of the transducers having an output circuit interconnected with a control circuit for the relay means and an input circuit for controlling the conductivity state of the output circuit. The input circuits of the tranducers are interconnected with respective ones of the voltage dividing circuits, whereby each of said voltage dividing circuits functions independently to exercise a control of said relay means. In a preferred embodiment the relay means includes a silicon controlled rectifier and the transducers are transistors, the emitter-collector circuits of which are connected in parallel across the gate-cathode circuit of the silicon controlled rectifier. In a preferred system for providing thermal protection for polyphase A.C. motors, the condition-responsive impedance elements are thermistors which are embedded in the different phase windings.

In the accompanying drawings, in which several of various possible embodiments of the invention are illustrated.

FIG. 2 is an end view of a polyphase A.C. motor, partially broken away, having thermistors embedded in the windings thereof;

FIG. 3 is a schematic circuit diagram of a thermal protection system for the motor of FIG. 2;

FIG. 7 is a schematic circuit diagram of another control system.

Corresponding reference characters indicate corresponding parts throughout the drawings.

Figure 1:
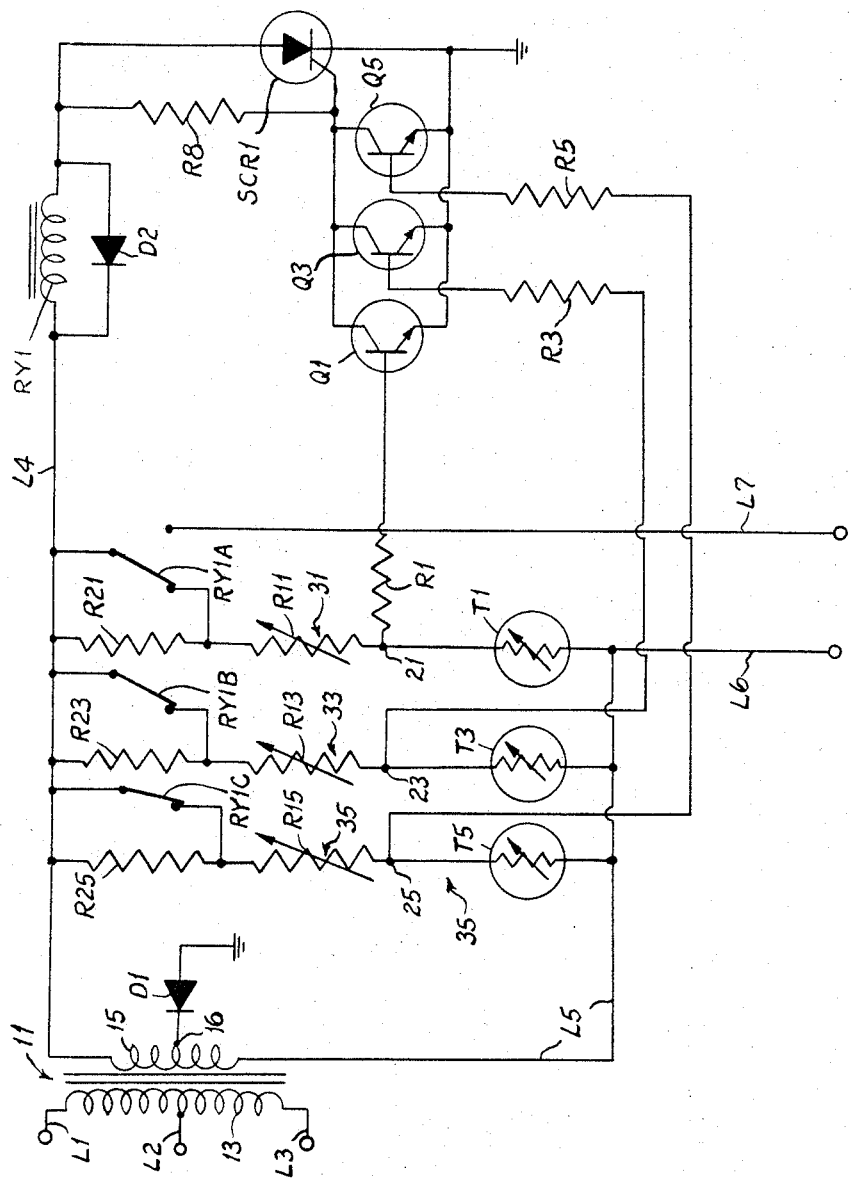
FIG. 1 is a schematic circuit diagram of a control system which is responsive to a plurality of temperature conditions.

Referring now to FIG. 1, one embodiment of the present invention is illustrated as comprising a step-down transformer 11 having a primary winding 13 to which are connected three conductors L1, L2 and L3 for supplying power from a conventional 240 v. A.C. source. Intermediate, tap L2, is a center tap whereby 120 v. A.C. may be employed. Transformer 11 is provided with a secondary winding 15, an intermediate tap of which is connected to ground through a diode D1. In the embodiment illustrated, the intermediate tap is a center tap 16 so that the secondary winding 15 provides balanced out-of-phase A.C. power, preferably at 24 v., to a pair of lines L4 and L5.

A pair of leads L6 and L7 are provided to which an external controlled load (not shown) can be connected. Power from the lines L4 and L5 can be applied to these leads through the normally open side of a set of relay contacts RY1A. Contacts RY1A are under the control of a relay coil RY1 and the coil is connected between the line L4 and ground by a circuit which includes a serially-connected silicon controlled rectifier SCR1. The silicon controlled rectifier is a semiconductor current switching device which is operable as a relay means to enable a small trigger signal to control a substantial amount of power. A resistor R8 interconnects the anode and gate electrodes of rectifier SCR1, providing triggering current to fire the rectifier when an A.C. voltage is applied across the anode-cathode circuit in the forward direction. Since the silicon controlled rectifier conducts in one direction only, the relay coil RY1 is shunted by a diode D2 which permits the inductively stored current to free-wheel during alternate half cycles.

The emitter-collector output circuits of three NPN transistors Q1, Q3 and Q5 are connected in parallel across the gate-cathode circuit of the silicon controlled rectifier SCR1. The base terminals of the transistors are respectively connected, through current-limiting resistors R1, R3 and R5, to junctions 21, 23 and 25 of a plurality of voltage dividers 31, 33 and 35. Each of the voltage dividers is connected across the lines L4 and L5 and each includes, in series connection, a thermistor T1, T3 and T5, an adjustable reference level resistor R11, R13 and R15, and a response differential resistor R21, R23 and R25. Within each voltage divider, the junction to which the respective transistor base terminals is connected is between the thermistor and the reference level resistor.

The normally closed side of relay contacts RY1A normally shunts differential resistor R21 of the voltage divider 31. Relay coil RY1 also controls two other poles or sets of relay contacts, RY1B and RY1C. These contacts are connected so as to normally shunt the differential resistors R23 and R25 respectively.

The anode-cathode circuit of rectifier SCR1 is connected in a circuit between one side of the center tapped secondary winding 15 and ground. Since the center tap 16 of the secondary winding 15 is connected to ground by diode D1, rectifier SCR1 and its associated control circuitry will be operative only on those half cycles of the A.C. supply voltage during which the line L4 is positive with respect to ground. Accordingly, in the following description the polarities ascribed to various portions of the circuit should be understood to be those existing during such periods.

The emitters of transistors Q1, Q3 and Q5 are held at ground potential and lines L4 and L5 are at opposing potentials with respect to ground. Therefore, the polarity of the voltage present at each one of the junctions 21, 23 and 25 with respect to ground will depend upon the relative values of resistance presented by the respective thermistor and reference resistor. The transistors Q1, Q3 and Q5 are operative to sense this voltage. If the resistance of any one of the thermistors becomes higher than that of its respective reference resistance so that the junction between them becomes positive, the base-emitter junction of the respectively connected transistor will be forward biased and that transistor will conduct. As is understood by those skilled in the art, these transistor transducers amplify and have gain between their base-emitter input circuits and their collector-emitter output circuits. The value of thermistor resistance at which the transition occurs can be preselected by adjusting the respective reference resistor R11, R13 and R15.

If any one of the parallel-connected transistors is caused to conduct as described above, current from the resistor R8 will be shunted away from the gate-cathode circuit of the silicon controlled rectifier SCR1 and thereby inhibit its firing. It can thus be seen that any one of the thermistors can operate independently to terminate energization of the relay RY1 and disconnect the load.

The effect of the selective shunting of the differential resistors R21, R23 and R25 by the relay contacts is to provide a highly desirable response differential between the temperature at which each thermistor will deenergize the relay coil RY1 and the temperature which will produce reenergization. It should be noted that, as to either energization or deenergization, the change in each divider produced by the operation of the relay is regenerative with respect to the temperature-induced change which would produce that operation of the relay. For example, an increase in the resistance of thermistor T1 will forward-bias the transistor Q1, thereby causing rectifier SCR1 to be cut off and relay coil RY1 to be deenergized. Deenergization of the relay coil will cause relay contacts RY1A to shunt differential resistor R21 of the divider, thereby further increasing the forward bias to the transistor Q1. Accordingly, before thermistor T1 can cause a reenergization of the relay, it must be brought to a temperature which will cause it to exhibit a resistance which is somewhat lower than the resistance which initiated deenergization of the relay.

As will be understood by those skilled in the art, this differential in response eliminates chattering of the relay.

Similarly, when the resistance of thermistor T1 then drops low enough to provide a negative voltage at the junction 21, transistor Q1 will be reverse biased and cut off and the rectifier SCR1 will reenergize the relay. Energization of the relay will cause differential resistor R21 to be effectively reinserted in the upper portion of the divider thereby augmenting the reverse bias of the base-emitter junction of the transistor Q1. As each voltage divider includes a separate differential resistor, the response differential can be independently preselected for each.

When a differential resistor is not shunted by the relay contacts, it is effectively a part of the reference resistance which must be balanced by the resistance of the respective thermistor in controlling the relay. The operation of the normally closed relay contacts may thus be properly described, hereinafter and in the claims, as shunting a portion of the reference impedance.

FIGS. 2 and 3 illustrate an arrangement of the FIG. 1 control as a protector system for providing thermal overload protection for a three phase A.C. motor 41. The motor 41 is conventional and includes a stator 43 provided with a multiplicity of slots 45 for receiving the energizing windings. Distributed among the slots 45 are three windings W1, W3 and W5 which are conventionally arranged for creating a rotating magnetic field within the stator when energized by connection to a suitable three phase A.C. supply. A squirrel cage rotor 51 is mounted for rotation concentrically within stator 43. At different points within the windings are embedded the three thermistors T1, T3 and T5. These thermistors sense the temperature of contiguous portions of the windings. Preferably each thermistor is in a different one of the windings W1, W3 and W5 so that a concentration or overload of current in any one winding, which would cause localized heating, will necessarily cause at least one of the thermistors to be heated.

Referring now to the circuit diagram of FIG. 3, windings W1, W3 and W5 are interconnected in a star or Y configuration and are connected, through the contacts RY3A, RY3B and RY3C of a contactor having a control winding RY3, for energization from a suitable three phase power source connected at lines L1, L3 and L5. The control circuitry is essentially identical with that shown in FIG. 1 and, as indicated previously, the same reference characters have been used. The circuit has, however, been rearranged with the thermistors T1, T3 and T5 being positioned adjacent respective motor windings W1, W3 and W5. The primary winding 13 of transformer 11 is connected across two (L1, L2) of the three supply leads to provide single phase power to the control circuitry. Leads L6 and L7, by means of which the control circuitry can operate a load device as explained previously, are connected to control winding RY3.

For use in this application, the thermistors T1, T3 and T5 are chosen to have positive temperature coefficients of resistance. Accordingly, if motor 43 is relatively cool, each of the thermistors T1, T3 and T5 exhibits a low resistance, i.e., a resistance less than that of the respective refrence resistor. The voltage at each of the junctions 21, 23 and 25 is therefore below ground potential on those half cycles of the applied A.C. during which silicon controlled rectifier SCR1 is forward biased. Accordingly, the respective transistors Q1, Q3 and Q5 are cut off and the current passing through resistor R8 is free to trigger rectifier SCR1. Conduction in rectifier SCR1 energizes coil RY1 causing contacts RY1A to in turn energize contactor winding RY3. The operation of the motor contactor closes contacts RY3A, RY3B and RY3C, rendering it possible for power to be applied to the motor windings.

If, however, any one of the windings should overheat so that its temperature exceeds a preselected threshold, the resistance of the respective thermistor will rise above that of the respective reference impedance and the voltage at the respective junction will forward bias the transistor connected thereto. The particular temperature threshold at which this change in balance occurs can be preselected by adjustment of the respective reference resistor R11, R13 or R15. When any one of transistors Q1, Q3 or Q5 is forward biased, the current flowing through resistor R8 is shunted away from the gate electrode of rectifier SCR1 so that the rectifier can not fire. Accordingly, relay coil RY1 and contactor winding RY3 will become deenergized and contacts RY3A, RY3B and RY3C will open thereby rendering it impossible to continue the application of power to the motor windings. The motor can not be reenergized until each of the windings cools down below a predetermined reset temperature. The reset temperature for each winding is determined in relation to the trip threshold temperature by the value of the respective response differential resistor R21, R23 or R25.

It should be noted that each of the thermistors T1, T3 and T5 operates independently to protect the motor from overheat damage since, if any one of the respective transistors Q1, Q3 and Q5 is forward biased, the contactor will be operated to deenergize the motor. Accordingly, localized heating, such as might be caused by a current overload in only one of the windings, will be unlikely to cause damage before the system trips thereby deenergizing all windings. Even if one of the thermistors or its leads were to short circuit, the remaining thermistors would be free to trip the protector system. Further, if any of the individual leads to the thermistors or their common lead L5 should open circuit, the resulting unbalance in the respective dividers would cause the motor to be immediately deenergized.

While the protector system of FIG. 3 employs both a relay and a contactor, it will be apparent to those skilled in the art that the silicon controlled rectifier could operate the contactor directly and that the contactor itself can be equipped with additional contacts for selectively shunting the response differential resistors to provide the desirable temperature differential between the temperatures at which the system trips and resets.

Figure 4:
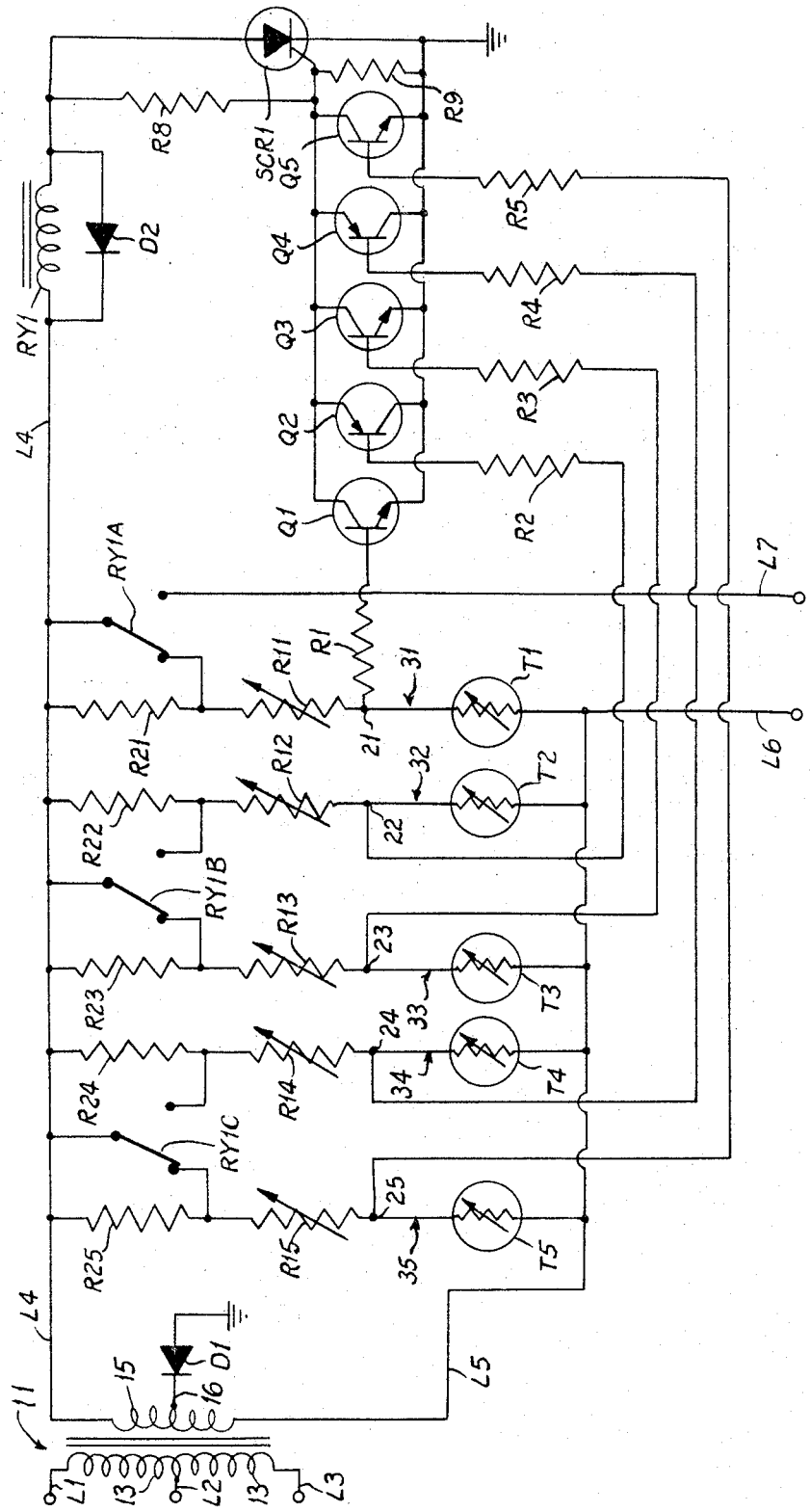
FIG. 4 is a schematic circuit diagram of a modification of the FIG. 1 system employing transistors of complementary conductivity types.

FIG. 4 illustrates a modification which is responsive to two more variable conditions than the FIG. 1 circuit but which requires no additional poles on the relay for providing the response differentials. In this modification, the gate-cathode circuit of rectifier SCR1 is shunted by the output circuits of the transistors which are of complementary conductivity types. Transistors Q1, Q3 and Q5 are of NPN type and transistors Q2 and Q4 are of PNP type. The emitters of transistors of one conductivity type are connected to the collectors of transistors of the opposite type to obtain the parallel output circuit connection. A resistor R9 shunts the gate-cathode circuit to stabilize the potential at the gate of rectifier SCR1. The voltage at the emitters of the PNP transistors Q2 and Q4 is thus also stabilized.

The base terminals of PNP transistors Q2 and Q4 are connected to junctions 22 and 24 within voltage dividers 32 and 34 respectively. The voltage dividers 32 and 34 are similar to dividers 31, 33 and 35 in that each includes, in series connection, a thermistor T2 and T4, a reference resistor R12 and R14, and a differential resistor R22 and R24. The differential resistors R22 and R24, however, are connected so that they will be shunted by the normally open contacts RY1B and RY1C respectively when the relay is energized rather than when it is deenergized. Thus each of the contacts RY1B and RY1C is arranged to alternately shunt the differential resistors associated with transistors of complementary conductivity types.

By virtue of their connection to the gate-cathode circuit of rectifier SCR1, the emitters of the transistors Q2 and Q4 are held at a voltage which is very close to ground potential and they are thus effectively connected to the center tap 16 which is grounded through diode D1. Accordingly. The base-emitter input circuits of the transistors Q2 and Q4 are effective to sense the voltage at the divider junctions 22 and 24 with respect to ground potential.

For example, if the resistance of thermistor T2 decreases so that the voltage at junction 22 becomes effectively negative with respect to ground potential, the base-emitter junction of transistor Q2 will be forward biased and transistor Q2 will conduct, thereby cutting off rectifier SCR1 and deenergizing the relay. As in the FIG. 1 example, however, each of the dividers 31–35 can operate independently to terminate energization of the single relay RY1.

Although the relay contacts RY1B and RY1C shunt the differential resistors R22 and R24 when the relay is energized rather than when it is deenergized, the resultant change in the balance of the respective divider is still regenerative due to the fact that the transistor Q2 and Q4 employed to sense the condition of the dividers 32 and 34 are of a conductivity type which is complementary to transistors Q1, Q3 and Q5.

To illustrate, thermistor T2 causes deenergization of the relay when its resistance is lowered so that the PNP transistor Q2 is forward-biased. The release of the relay eliminates the shunting effect of the contacts RY1B so that differential resistor R22 is effectively introduced into voltage divider circuit 22. This increase in the resistance of the upper leg of the voltage divider circuit 32 causes a further increase in the forward bias applied to the transistor Q2, the increase being regenerative with the change which initiated the release of the relay. Accordingly, a differential in response is provided, the size of the differential being dependent upon the magnitude of resistance R22.

It should be noted that, since each of the voltage dividing circuits 31–35 is provided with a separate differential resistor R21–R25, the differential in response for each of the several variable sensed conditions can be independently preselected. However, although the control is responsive to five different variable conditions, the differentials in response are provided by only three sets of contacts or relay poles and one of these sets of contacts also switches the power to the controlled load. This economical result is made possible by the employment of transistors of complementary conductivity types, so that opposite changes in resistance are effective to produce the same effect on the conductivity of the detecting transistor.

For use in the refrigeration or air conditioning applications discussed previously, only the first three thermistors T1–T3 shown in FIG. 4 would be necessary and the relay would need to be provided with only two double-throw poles. Assuming negative-coefficient thermistors, the thermistor T1 can be physically positioned to sense room temperature and thus provide the function of thermostatic control. Thermistor T3 is positoned contiguous the evaporator coils to sense frost buildup by abnormal temperature depression and thermistor T2 can be embedded in the motor windings to detect overheating.

Assuming that there has been no frost buildup on the evaporator no overheating of the compressor motor and that the transistors Q2 and 3 are thus cut off, the thermistor T1 can exercise normal control to maintain the temperature in the controlled zone at a preselected level. If the temperature within the zone rises above the level preselected by the adjustment of reference resistor R11, the resistance of the thermistor T1 will decrease and the NPN transistor Q1 will be cut off. As all of the operative transistors will then be in their nonconducting state, resistor R8 will provide triggering current to rectifier SCR1 which will, in turn, energize the relay RY1. The energization of the relay will close the circuit through relay contacts RY1A to the load, thereby initiating operation of the air conditioning apparatus to remove heat from the controlled zone and lower its temperature. Since the energization of the relay will also have caused contcats RY1A to effectively introduce differential resistor R21 into the voltage divider circuit 21, the temperature in the control zone will have to be lowered somewhat below the temperature selected for the initiation of cooling before the relay RY1 is released. The value of this differential can be preselected by the choice of the resistance of resistor R21 and, for a close control of temperature in the controlled zone, this resistance can be made quite small within the limits imposed by circuit stability.

If at any time the compressor motor should overheat, the thermistor T2 will exhibit a decrease in resistance which will cause a negative voltage to appear at the junction 22 between thermistor T2 and resistor R12. This negative voltage will forward-bias the PNP transistor Q2 which will, in turn, cause rectifier SCR1 to be cut off and relay coil RY1 to be deenergized. The deenergization of the relay will disconnect the compressor by operation of contacts RY1A while contacts RY1B will connect the resistor R22 into the voltage divider circuit 32. If the resistance R22 is relatively large, the motor will have to cool down substantially below that temperature which caused deenergization of the relay before the apparatus can be recycled.

Similarly if frost builds up on the evaporator, the thermistor T3 will be cooled to an abnormally low temperature and its resistance will increase causing the transistor Q3 to be forward-biased. Conduction in transistor Q3 will also deenergize the relay and disconnect the load until a suitable temperature differential, determined by the value of resistor R23, is overcome.

Figure 5:
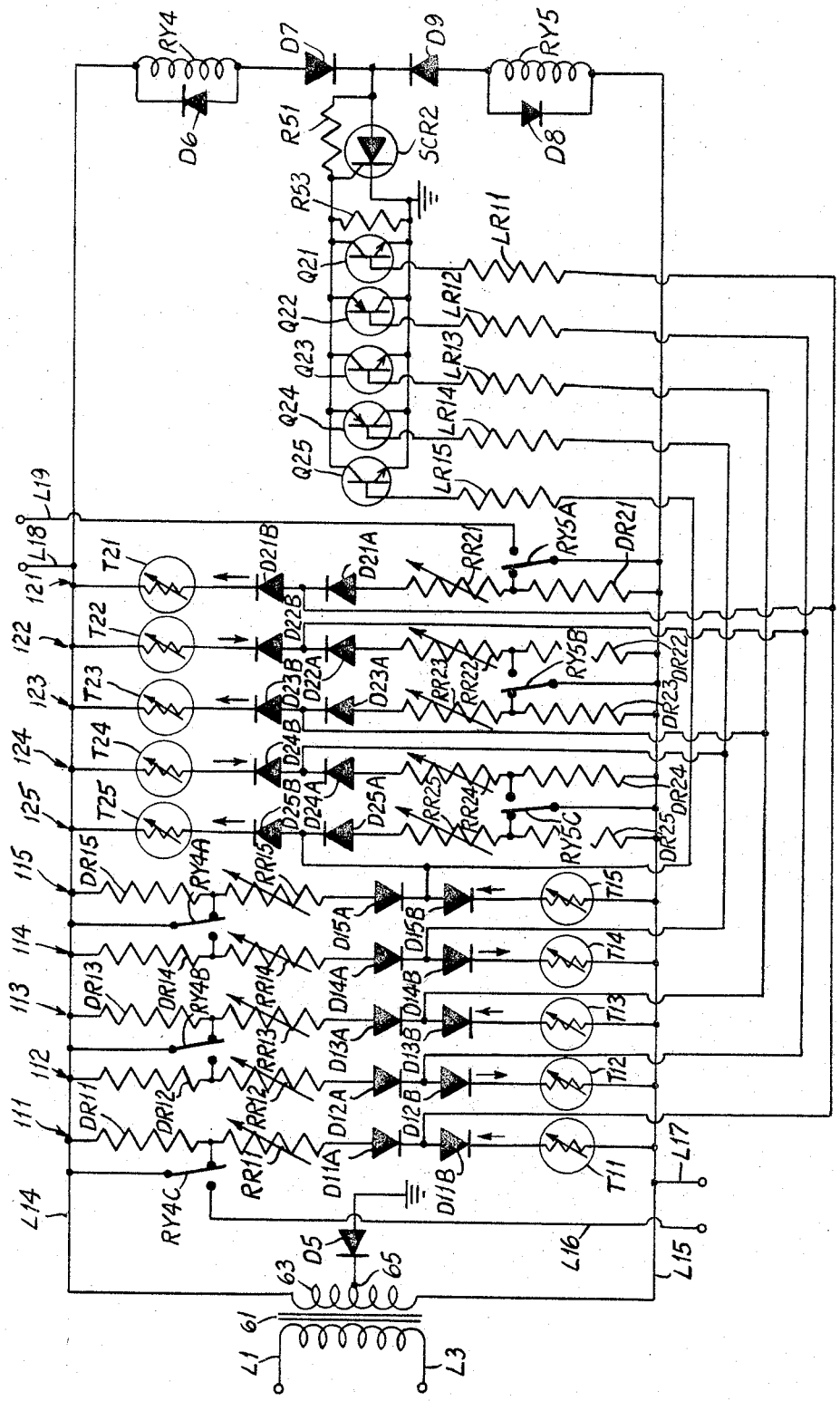
FIG. 5 is a schematic circuit diagram of a system for controlling a pair of load devices in response to respective pluralities of variable conditions.

FIG. 5 illustrates a modification of the control apparatus which is operative to control each of a pair of load devices in response to a respective plurality of conditions. Even though there are two load devices, each of which is responsive to as many variable conditions as the single load device in the previous example, the embodiment of FIG. 5 requires no additional transistors or controlled rectifiers. This advantageous result is obtained by means of a time sharing mode of operation of the control circuitry in which each load device is energized only during respective alternate half cycles of the applied A.C. power.

Referring now to the circuit diagram of FIG 5, A.C. power for the control is obtained from a conventional source connected at conductors L1, L3 through a transformer 61. Transformer 61 is provided with a secondary winding 63 having a center tap 65 which is connected to ground through a diode D5. The ends of secondary winding 63 are connected to provide out-of-phase A.C. power to a pair of lines L14 and L15. A relay coil (RY4, RY5) is connected between each of these lines and ground by a series circuit which includes a commoly employed silicon controlled rectifier SCR2 and a respective steering diode D7, D9. Each steering diode prevents the respective relay coil from being energized except during those A.C. half cycles when the respective line (L14 or L15) is at a positive voltage with respect to ground. Each relay coil is shunted by a diode (D6, D8) which permits the inductively stored current to freewheel during the alternate half cycles.

A resistor R51, connecting the gate electrode of the controlled rectifier SCR2 to its anode, provides a source of current for triggering the rectifier when it is forward biased. As in the previous embodiment, the gate-cathode circuit of the silicon controlled rectifier is shunted by the output circuits of a plurality of transistors Q21–Q25 of both conductivity types, the emitters of transistors of one conductivity type being connected to the collectors of transistors of the opposite type to obtain the parallel output circuit connection. A parallel resistor R53 stabilizes the potential at the emitters of the PNP transistors Q22 and Q24.

Connected in parallel across lines L14 and L15 are a plurality of voltage dividers 111–115 and 121–125. Each divider includes in series a thermistor (T11-T15 and T21-T25), a reference resistor (RR11–RR15 and RR21–RR25), and a response differential resistor (DR11–DR15 and DR21–DR25). Each of the dividers 111–115 further comprises, between the respective thermistor and reference resistor, a pair of serially connected steering diodes (D11A and B through D15A and B) which are polarized in one direction while each of the dividers 121–125 similarly includes a pair of diodes (D21A and B through D25A and B) which are oppositely polarized. The junction between the pair of diodes in each of the dividers 111–115 is connected to a similar junction in a respective one of the dividers 121–125. Each such pair of junctions is commonly connected, through a respective current limiting resistor LR11–LR15 to the base terminal of a respective one of the transistors Q21–Q25.

Relay coil RY4 operates three sets of contacts RY4A, RY4B and RY4C which are connected for selectively shunting the response differential resistors in the dividers 111–115 in the same manner as illustrated in the previous embodimets. The normally open side of contacts RY4C is connected for supplying power to an external load (not shown) through lines L16 and L17. Coil RY5 similarly operates contacts RY5A, RY5B and RY5C for shunting the response differential resistors in dividers 121–125 and for selectively supplying power to an external load (not shown) connected to a pair of lines L18 and L19.

The operation of the FIG. 5 embodiment is essentially as follows. On half cycles of the applied A.C. power during which the line L14 is positive with respect to ground, diode D9 blocks conduction from transformer 61 through coil RY5 so that the condition of the silicon controlled rectifier during this period can not affect the energization of this relay. At the same time the diodes D21A and B through D25A and B are reverse biased so that the junction between each pair is effectively isolated from both lines L14 and L15. Thus, the dividers 121–125 are ineffective to influence the conditions of transistors Q21–Q25 or rectifier SCR2 during this period.

On the other hand, diode D7 is forward biased during this period so that coil RY4 can be energized by conduction through rectifier SCR2. Simultaneously the diodes D11A and B through D15A and B are forward biased so that the dividers 111–115 are conductive and the respective thermistors T11–T15 are thus effective in controlling the energization of relay coil RY4 in the manner described with reference to FIG. 4. The energization of relay coil RY4 during such half cycles is in turn effective to provide differentials in the response by means of contacts RY4A, RY4B and RY4C and to selectively energize a load connected at lines L16 and L17.

On the alternate half cycles, when line L15 is positive with respect to ground, an opposite situation exists. Relay coil RY4 is blocked from energization by diode D7 and dividers 111–115 are rendered ineffective by diodes D11A and B through D15A and B. Simultaneously, coil RY5 is rendered responsive to conduction through rectifier SCR2 by diode D9 and diodes D21A and B through D25A and B are forward biased so that the dividers 121–125 can exercise control over rectifier SCR2 in the manner described with reference to FIG. 4.

From the above, it will be apparent to those skilled in the art that the FIG. 5 embodiment essentially incorporates two control system structures similar to that shown in FIG. 4, which structures share a single set of transistors and a single silicon controlled rectifier. The sharing is done on a time basis with each load controlling relay and its associated condition-responsive voltage dividers being operative on respective alternate half cycles of the applied A.C. power. The switching of the transistors and silicon controlled rectifier between the two structures is accomplished by steering diodes in the relay and voltage divider circuits which effectively disconnect the undesired components on alternate half cycles.

Figure 6:
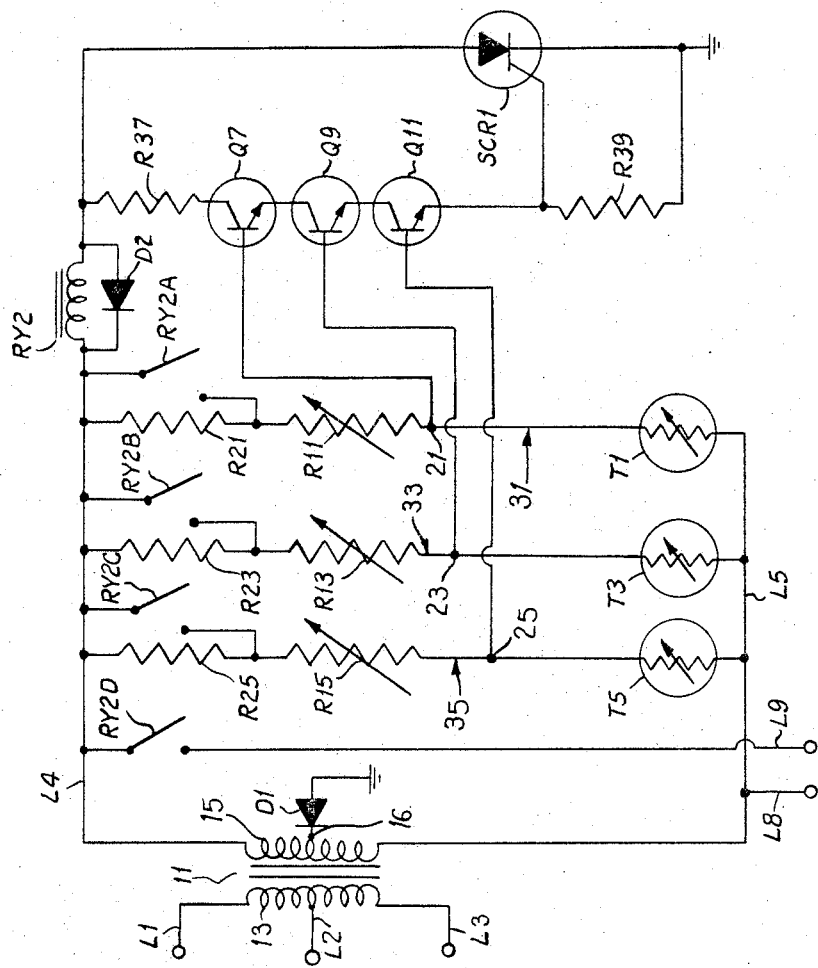
FIG. 6 is a schematic circuit diagram of a control system employing serially connected sensing transistors.

FIG. 6 illustrates a modification in which a series output connection of the sensing transistors is employed to obtain a mode of operation in which the silicon controlled rectifier and the relay are deenergized when any one of the sensing transistors is deenergized.

As in the embodiments of FIG. 1, a relay coil RY2 is connected between the line L4 and ground in a circuit which includes serially connected silicon controlled rectifier SCR1. The emitter-collector output circuits of three NPN transistors Q7, Q9 and Q11 and a current limiting resistor R37 are connected in series between the anode and the gate electrode of rectifier SCR1. A resistor R39 connected across the gate-cathode circuit of the silicon controlled rectifier shunts any leakage currents and prevents premature conduction.

The base terminals of transistors Q7, Q9 and Q11 are connected to junctions 21, 23 and 25 of voltage dividers 31, 33 and 35 respectively. The response differential resistors R21, R23 and R25 in the respective voltage dividers are interconnected with normally open contacts RY2A, RY2B and RY2C respectively so that they are shunted when the coil RY2 is energized. A fourth set of relay contacts RY2D permits power to be applied from the lines L4 and L5 to a controlled load (not shown) through leads L8 and L9. Base current limiting resistors (not shown) may be employed with transistors Q7, Q9, and Q11 as shown and described in connection with FIG. 1.

Despite their serial output connection, the transistors Q7, Q9 and Q11 are effectively operative to sense the potentials at the junctions 21, 23 and 25 relative to ground, as are the transistors in the previous examples. Assuming initially that the relative resistance values of the thermistors and the reference resistors are such that each of the junctions 21, 23 and 25 is positive with respect to ground, the transistors Q7, Q9 and Q11 will all be in a conductive state. Current passing through the resistor R37 and the respective transistor output circuits will trigger rectifier SCR1 and the relay coil RY2 will be energized. In this state, the saturation voltage across the emitter-collector circuit of each transistor will be quite small with any residual voltage appearing across the current limiting resistor R37, and thus each of the transistor emitters is held close to ground potential.

Accordingly, if the voltage at any one of the junctions 21, 23 and 25 should then drop below ground potential, the respective transistor will be cut off, thereby deenergizing rectifier and the relay coil RY2. The voltage between the line L4 and ground will then appear almost entirely across the cut off transistor. Since cutting off of any one of the transistors Q7, Q9 or Q11 can cause this operation, it is seen that each of the dividers 31, 33 and 35 operates independently to exercise a control over the relay and that the respective transistors are operative to sense the voltage at the junctions 21, 23 and 25 with respect to ground potential.

At this point it will be apparent to those skilled in the art that, even though their respective divider junctions 21 and 23 are substantially above ground, the upper two transistors Q7 and Q9 may not be forward biased if the transistor Q11 is not in a conductive state. If transistor Q11 is cut off, the emitters of transistors Q7 and Q9 can rise substantially above ground potential and thus their base terminals can also be above ground potential without effecting a forward bias. However, since the intended mode of operation of this circuit does not include the energization of the silicon controlled rectifier when any transistor is cut off, the lack of conduction in transistor Q9 does not produce any undesired effects.

The deenergization of the relay RY2 effectively introduces additional resistance into the upper portion of each voltage divider 31, 33 and 35. Since a drop in voltage at any of the junctions 21, 23 and 25 is operative to cause the release of the relay, it can be seen that the change in the balance of each divider caused by the additional resistance is regenerative with the original change which initiated the operation. Accordingly, a desirable difference in response is provided between energization and deenergization so that contact chattering and overly rapid recycling are eliminated.

FIG. 7 illustrates a modification in which regenerative amplification is employed to provide a response differential. Referring to the drawing, A.C. power, preferably at 24 v., is obtained from a source (not shown) connected to conductors L201 and L202. A relay coil RY201 or other load to be controlled is connected across line L201 and L202 through a circuit which includes a current limiting resistor R200 and the anode-cathode circuit of a silicon controlled rectifier SCR201. A diode D200 shunts coil RY201 to permit inductively stored current to free-wheel on alternate half cycles.

The primary winding 213 of a transformer 211 is connected across lines L201 and L202. The transformer has a secondary winding 215 having a center tap 216. The out-of-phase A.C. voltages present at the ends of winding 215 are full-wave rectified by a pair of diodes D201 and D202 and filtered by a capacitor C201 to provide an isolated or floating source of D.C. potential between a pair of supply leads L204 and L205.

Connected in parallel across leads L204 and L205 are a plurality of voltage dividers 221–223. Each divider includes in series a thermistor (T201–T203) and an adjustable reference level resistor (R201–R203). The junction between the thermistor and reference resistor in each of dividers 221–223 is connected, through a respective current limiting resistor R221–R223, to the base terminal of a respective input transistor Q201–Q203. Transistors Q201–Q203 are of the NPN type and are preferably of silicon construction exhibiting low leakage.

The emitter-collector circuits of transistors Q201–Q202 are connected in parallel emitter-to-emitter and share a common collector load resistor R224. The emitters are connected to line L205 through a resistor R225. A pair of resistors R226 and R227 are connector in series between the joined collectors of transistors Q201 and Q202 and line L205. The junction between resistors R226 and R227 is connected to the base terminal of an NPN output transistor Q204. Resistors R226 and R227 thus constitute a voltage divider for applying a portion of the amplified voltage appearing at the collectors of transistors Q201 and Q202 to the base terminal of transistor Q204.

Transistor Q203 is provided with a variable collector load resistor R228 which connects the collector terminal to line L204. A pair of resistors R229 and R230 are connected in series between the collector of transistor Q203 and line L205. The junction between resistors R229 and R230 is connected to the base terminal of an NPN output transistor Q205 so that these resistors constitute a voltage divider coupling a portion of the amplified voltage present at the collector of input transistor Q203 to the base of output transistor Q205. The emitters of transistors Q203 and Q205 are connected together and are commonly connected to lead L205 through the resistor R225. This common connection provides regenerative coupling from output transistor Q205 back to input transistor Q203. As will be understood by those skilled in the art, this regeneration will cause the amplifying circuit which includes transistors Q203 and Q205 to function similarly to a Schmitt trigger, that is, the circuit will exhibit a sharply defined threshold in response to voltage applied to the base terminal of transistor Q203 and there will be a differential in response between the input voltage which will turn transistor Q203 on and the voltage which will turn it off. The extent of the differential can be adjusted by varying the value of resistor R228.

The collector of transistor Q205 is connected to the emitter of transistor Q204. Thus, when transistor Q205 is turned on or rendered conductive, the emitter of output transistor Q204 is effectively connected to resistor R225 commonly with the emitters of input transistors Q201 and Q202. Accordingly, resistor Q225 also provides regeneration from output transistor Q204 back to the two input transistors Q201 and Q202 which drive it. This regeneration provides an operation of the amplifying circuit including transistors Q201, Q202 and Q204 which also resembles a Schmitt trigger. This circuit is, however, responsive to two input signals which can be applied independently to the base terminals of either transistor Q201 and Q202 rather than to just a single input terminal. It will be noted that the two inputs are effectively isolated by being applied to the base terminals of separate transistors. If either of the two input transistors Q201 and Q202 is forward biased, the output transistor Q204 is turned off.

The gate electrode of rectifier SCR201 is connected to supply lead L204 through a current limiting resistor R233 and the collector of transistor Q204 is connected to the cathode of rectifier SCR201. Since the D.C. voltage provided across lines L204 and L205 is floating with respect to the relay circuit, the connection of the collector of transistor Q204 to the cathode of rectifier SCR201 provides the only source of current which can be transmitted by the control circuitry through resistor R233 to the gate electrode of rectifier SCR201. Since the emitter-collector circuits of transistors Q204 and Q205 are connected in series, triggering current can be supplied to the rectifier only when both of these serially connected transistors are conductive. Thus the triggering of the rectifier is dependent upon the condition of each of the two regenerative trigger circuits. Further, since conduction in transistor Q204 can occur only if both transistors Q201 and Q202 are cut off, the control is dependent in operation upon the conduction of each of the input transistors Q201–Q203. A capacitor C203 connecting the collector of transistor Q204 to the base of transistor Q205 provides a time-dependent degeneration which smooths the switching operation.

The operation of this control in the arrangement illustrated is as follows:

If all of the thermistors T201–T203 are in a low resistance state, the respective input transistors Q201–Q203 will be cut off. Accordingly, current flowing from line L204 through resistors R224 and R226 will forward bias and thus render conductive transistor Q204. Current from line L204 will also flow through resistors R228 and R229 to forward bias and turn on transistor Q205. When both transistors Q204 and Q205 are conductive, current can flow from the control circuitry through resistor R233 to the gate-cathode circuit of rectifier SCR201 thereby triggering it into conduction and causing energization of the relay RY201.

If, however, the resistance of either of the thermistors T201 or T202 should increase so that the voltage at the junction between the respective reference resistor and the thermistor rises sufficiently to forward bias the respective input transistor Q201 or Q202, that transistor will conduct thereby drawing current through resistor R224. Current flow through resistor R224 will reduce the voltage at the base of transistor Q204 so that transistor Q204 is cut off and rendered nonconducting. When transistor Q204 is cut off, current can no longer flow to the gate electrode of rectifier SCR201 and the rectifier will thus block current flow to the relay RY201 thereby deenergizing it.

Similarly, if the resistance of thermistor T203 should increase with respect to its reference resistor R203 so that input transistor Q203 is forward biased, transistor Q203 will draw current through resistor R228 from the lead L204 thereby reducing the voltage at the base of transistor Q205 and rendering it nonconductive as indicated previously. The cutting off of transistor Q205 will prevent rectifier SCR201 from being triggered and will thus also deenergize coil RY201. Accordingly, it can be seen that each of the thermistors T201–T203 independently exercises a control over the relay coil RY201.

As will be apparent to those skilled in the art, the regeneration present in this circuit will cause there to be a differential between that resistance of each thermistor which will cause energization of the relay and that value of resistance which will turn off the relay. The regeneration also causes each of the thresholds to be relatively sharply defined as contrasted with a circuit in which no regeneration is present. Since each of the voltage dividers is connected to a different input transistor, an effective isolation of the different input signals is achieved and interaction between the different sensed conditions is avoided.

While various particular embodiments have been illustrated, it is apparent that other modifications can be devised. If, for example, it is desired to reverse the mode of operation of any one of the voltage dividing circuits shown, this can be accomplished merely by interchanging the thermistor with its respective reference resistor. While each of the controls has been described as employing thermistors, it will be readily understood by those skilled in the art that other types of impedance-varying condition sensors may be substituted. With any such sensors, or any combination thereof, the control system according to the invention will provide a control which is responsive to a plurality of variable conditions, each of which exercises an independent control over the load. Further, while the embodiments illustrated employ electromechanical relays, the silicon controlled rectifier shown could itself switch the power certain loads and thus operate as a relay means or current switching means which is independently controlled by a plurality of variable conditions. Similarly, alternate or additional stages of solid state circuitry could be used for greater power gain between the sensing elements and the load.

The control system of this invention is useful in the operation of a variety of load devices in response to the sensed conditions. For example, the system may be used in refrigeration apparatus to control within preset limits the freezer temperature, the box temperature, the frost buildup and to protect the compressor motor by means of a sensing thermistor buried in the motor windings.

In view of the above, it will be seen that the several objects of the invention are achieved and other advantageous results attained.

As various changes could be made in the above constructions and circuits without departing from the scope of the invention, it is intended that all matter contained in the above description or shown in the accompanying drawings shall be interpreted as illustrative and not in a limiting sense.

What is claimed is:

1. Control apparatus responsive to a plurality of variable conditions for controlling a load device comprising:
   a plurality of voltage dividers each of which includes a condition-responsive impedance element serially connected with a reference impedance element, each of said voltage dividers having an electrical junction between the condition-responsive and reference impedance elements thereof;
   a voltage source, said voltage dividers being connected in parallel across said source;
   relay means for controlling the flow of electric power to said load device, said relay means including a control circuit;
   and a plurality of electronic amplifying transducers each of which has an output circuit and an input circuit for controlling the conductivity state of said output circuit, the output circuits of said transducers being interconnected with the control circuit of said relay means, the operation of said relay means being dependent upon the conductivity state of each of said transducers, the input circuits of said transducers being interconnected with respective voltage divider junctions to control the conductivity of said output circuits, whereby each of said condition-responsive elements functions independently to exercise a control over said load device.

2. A control system according to claim 1 in which said condition responsive elements are thermistors.

3. Control apparatus according to claim 1 in which said voltage source comprises the secondary winding of a transformer, said secondary winding having an intermediate tap, and the input circuits of said transducers are connected between the intermediate tap of said secondary winding and respective ones of said junctions.

4. Control apparatus according to claim 3 in which said transducers are transistors, the emitter terminals of which are connected to said intermediate tap and the base terminals of which are connected to respective ones of said junctions.

5. Control apparatus according to claim 4 further comprising a diode in series connection between said intermediate tap and said emitters.

6. A control system according to claim 1 in which said relay means includes a silicon controlled rectifier.

7. A control system according to claim 6 in which said transducers are transistors, the emitter-collector circuits of which are connected in parallel across the gate-cathode circuit of said silicon controlled rectifier.

8. A control system according to claim 6 in which said transducers are transistors, the emitter-collector circuits of which are connected in series between a source of current and the gate electrode of said silicon controlled rectifier.

9. A control system according to claim 1 in which said relay means includes means for selectively shunting portions of said reference imperance elements thereby to provide a response dicerential in the operation of said relay means under the control of said condition-responsive impedance elements.

10. A control system according to claim 1 in which said transducers are interconnected in a regenerative circuit thereby to provide a response differential in the operation of said relay means under the control of said condition-responsive impedance elements.

11. A control system according to claim 1 in which said plurality of transducers comprises transistors of complementary conductivity types, the emitter-collector circuits of which are connected in parallel, the emitters of transistors of one conductivity type being connected to the collectors of transistors of the other type, and the base terminals of which are connected to respective ones of said junctions whereby different changes in the impedances of different condition-responsive elements produce similar effects on the operation of said relay means.

12. Control apparatus according to claim 11 in which said relay means comprises a relay having sets of contacts for alternately shunting portions of two of said reference impedance elements, the transistors respectively interconnected with the two reference elements being of complementary conductivity types whereby energization of said relay modifies the parameters of both reference impedance elements.

13. A control system according to claim 1 in which said relay means comprises a relay and a silicon controlled rectifier for switching control current to the relay and in which said transducers are transistors the emitter-collector circuits of which are connected in parallel across the gate-cathode circuit of said silicon controlled rectifier.

14. Control apparatus responsive to a plurality of variable conditions for controlling a load device comprising:
a first voltage divider including a first condition-responsive impedance element serially connected with a first reference impedance element, said voltage divider having a first junction electrically connected between the condition-responsive and reference impedance elements thereof;
a second voltage divider including a second condition-responsive impedance element serially connected with a second reference impedance element, said second voltage divider having a second electrical junction between the condition-responsive and reference impendance elements thereof;
a voltage source having an intermediate tap, said voltage dividers being connected in parallel across said source;
a relay having a control circuit, said relay having contacts for alternately shunting portions of said first and second reference impedance elements;
a first transistor of one conductivity type, the base-emitter circuit of which is connected between said intermediate tap and said first junction;
a second transistor of a conductivity type complementary to that of said first transistor, the base-emitter circuit of said second transistor being connected between said intermediate tap and said second junction, the emitter-collector circuits of said transistors being interconnected with the control circuit of said relay, the operation of said relay dependent upon the state of conduction of each of said transistors, whereby each of said condition-responsive elements functions independently to exercise a control over said load device and independent response differentials are provided in the operation caused by each of said condition-responsive elements.

15. Control apparatus according to claim 14 in which the relay control circuit includes a silicon controlled rectifier and the emitter-collector circuits of said transistors are connected in parallel across the gate-cathode circuit of said silicon controlled rectifier.

16. Control apparatus responsive to a plurality of variable conditions for controlling a pair of load devices comprising:
an A.C. voltage source having an intermediate potential tap;
a plurality of voltage dividers connected in parallel across said voltage source, each divider including a condition-responsive impedance element serially connected with a reference impedance element and having an electrical junction between the condition-responsive and reference impedance elements thereof, at least one pair of said voltage dividers each including unidirectional current flow means connected in series with said impedance elements for isolating the respective divider junctions from said voltage source during respective alternate half-cycles of said A.C. voltage source;
relay means connected to said intermediate tap for controlling the power to said load devices, said relay means means including a control circuit;
means interconnected with the relay means for alternately blocking current flow through said load devices on alternate half-cycles of said A.C. voltage source; and
a plurality of electronic amplifying transducers each of which has an output circuit and an input circuit for controlling the conductivity state thereof, the output circuits of said transducers being commonly interconnected with the control circuit of said relay means, the operation of said relay means being dependent upon the conductivity state of each of said transducers, the junctions of said pair of dividers being commonly connected to the input circuit of one of said transducers thereby to control the conductivity of said one transducer on respective alternate half-cycles, the junction of another divider being connected to the input circuit of a second of said transducers thereby to control the conductivity thereof, whereby each of said condition-responsive elements functions independently in exercising a control over a load device.

17. Apparatus according to claim 16 in which said relay means includes a silicon controlled rectifier and said transducers are transistors.

18. Control apparatus responsive to a plurality of variable conditions for controlling a pair of load devices comprising:
   an A.C. voltage source having an intermediate potential tap;
   four voltage dividers connected in parallel across said source, each divider including a condition-responsive impedance element serially connected with a reference impedance element and having a respective electrical junction between the condition-responsive and reference impedance elements thereof, the first and second dividers including rectifier means connected in series with said impedance elements for isolating the respective divider junctions from said source during A.C. half-cycles of one polarity, the third and fourth dividers including rectifier means for isolating the respective divider junctcions from said source during A.C. half-cycles of the other polarity;
   a first relay for controlling the flow of electric power to one load device, said first relay having a control winding circuit interconnected with said source and including a diode for blocking current flow therethrough on A.C. half-cycles of said one polarity;
   a second relay for controlling the flow of electric power to a second load device, said second relay having a control winding circuit interconnected with said source and including a diode for blocking current flow therethrough on A.C. half-cycles of said other polarity;
   a silicon controlled rectifier, said control winding circuits being commonly connected to said intermediate tap through the anode-cathode circuit of said silicon controlled rectifier;
   a first transistor of one conductivity type, the junctions of said first and third dividers being connected to the base terminal of said first transistor;
   a second transistor of a conductivity type complementary to that of said first transistor, the junctions of said second and fourth dividers being connected to the base terminal of said second transistor, the emitter-collector circuits of said transistors being connected in parallel across the gate-cathode circuit of said silicon controlled rectifier for controlling its conduction whereby the condition responsive impedance elements in said first and second voltage dividers function independently in exercising a control over said one load device and the condition responsive elements in said third and fourth voltage dividers function independently in exercising a control over said second load device.

19. Apparataus according to claim 18 in which said first relay includes contacts for alternately shunting portions of said first and second reference impedance elements and said second relay includes contacts for alternately shunting portions of said third and fourth reference impedance elements whereby energization of each relay modifies the parameters of the respective reference impedance elements thereby to provide response differentials in the operation of the relays.

20. A thermal protection control for electric apparatus which includes at least one current carrying winding, said control comprising:
   a plurality of voltage dividers each of which includes a temperature-responsive impedance element serially connected with a reference impedance element, each of said voltage dividers having an electrical junction between the temperature-responsive and reference impedance elements thereof, said temperature-responsive impedance elements being adapted to be embedded in the apparatus winding at different positions for sensing the temperature of contiguous portions thereof;
   a voltage source, said voltage dividers being connected in parallel across said source;
   current switching means for energizing the apparatus winding, said current switching means including a control circuit;
   a plurality of electronic transducers each of which has an output circuit and an input circuit for controlling the conductivity state of said output circuit, the output circuits of said transducers being interconnected with said control circuit for controlling the operation of said switching means, the operation of the switching means being dependent upon the conductivity state of each of said transducers, the input circuits of said transducers being interconnected with respective voltage divider junctions to control the conductivity of said output circuits, whereby each of said temperature-responsive impedance elements functions independently to deenergize the apparatus if the temperature at the respective contiguous portion of said winding exceeds a predetermined level thereby to protect the apparatus from damaging overtemperature conditions.

21. A thermal protection control for an electric motor having a plurality of windings, said motor being provided with a contactor for switching the flow of electric power thereto, said control comprising:
   a plurality of voltage dividers each of which includes a thermistor embedded in a respective one of said windings and serially connected with a reference impedance element, each of said voltage dividers having an electrical junction between the thermistor and reference impedance element thereof;
   a voltage source, said voltage dividers being connected in parallel across said source;
   means including a semiconductor current switching device for controlling the operation of said contactor; and
   a plurality of electronic transducers each of which has an output circuit and an input circuit for controlling the conductivity state of said output circuit, the output circuits of said transducers being interconnected with said semiconductor current switching device, the operation of said contactor being dependent upon the conductivity state of each of said trandsucers, the input circuits of said transducers being interconnected with respective voltage divider junctions to control the conductivity of said output circuits, whereby each of said thermistors functions independently to deenergize said motor if the temperature of the respective winding exceeds a predetermined level thereby to protect the apparatus from damaging overtemperature conditions.

22. A control according to claim 21 in which said semiconductor current switching device is a silicon controlled rectifier and said electronic transducers are transistors, the emitter-collector circuits of which are connected in parallel across the gate-cathode circuit of said silicon controlled rectifier.

23. A control according to claim 22 in which said motor is a polyphase A.C. motor having a plurality of phase windings and in which said source is an A.C. voltage source having an intermediate tap, the cathode of said silicon controlled rectifier being connected to said intermediate tap.

24. A control according to claim 21 in which said means for controlling the operation of said contactor includes means for varying the impedance of said reference impedance elements concurrently with the operation of said contactor for providing a differential in the operation of said contactor.

25. A thermally protected motor construction comprising:
- a polyphase alternating current motor having a plurality of current carrying phase windings;
- a contactor for switching the flow of electric power to said windings;
- a plurality of voltage dividers each of which includes a thermistor embedded in a respective one of said windings and serially connected with a respective reference impedance element, each of said voltage dividers having an electrical junction between the thermistor and reference impedance element thereof;
- an A.C. voltage source having an intermediate tap, said dividers being connected in parallel across said source;
- a plurality of transistors, said junctions being connected to respective base electrodes of said transistors for controlling conduction between the respective emitter and colletcor electrodes thereof;
- means including a silicon controlled rectifier for selectively energizing said contactor, the cathode of said rectifier being connected to said tap, the emitter-collector circuits of said transistors being connected in parallel across the gate-cathode circuit of said rectifier, the operation of said contactor being dependent upon the conductivity of each of said transistors whereby heating of any one of said windings above a predetermined temperature will operate said contactor to deenergize said motor thereby to protect the motor from damaging overtemperature conditions.

References Cited
UNITED STATES PATENTS

| | | | |
|---|---|---|---|
| 3,032,690 | 5/1962 | Elliot | 317—13 X |
| 3,262,014 | 7/1966 | Conner | 317—41 X |

MILTON O. HIRSHFIELD, *Primary Examiner.*

J. D. TRAMMELL, *Assistant Examiner.*